United States Patent
Yamasaki et al.

(10) Patent No.: US 6,823,528 B2
(45) Date of Patent: Nov. 23, 2004

(54) PROTECTIVE FILM FOR OPTICAL DISKS AND OPTICAL DISK USING THE FILM

(75) Inventors: Takeshi Yamasaki, Kanagawa (JP); Tomomi Yukumoto, Chiba (JP); Kazuya Katoh, Saitama (JP)

(73) Assignees: Lintec Corporation, Tokyo (JP); Sony Corporation, Tokyo (JP)

( * ) Notice: Subject to any disclaimer, the term of this patent is extended or adjusted under 35 U.S.C. 154(b) by 16 days.

(21) Appl. No.: 10/329,735

(22) Filed: Dec. 26, 2002

(65) Prior Publication Data

US 2003/0128651 A1 Jul. 10, 2003

(30) Foreign Application Priority Data

Jan. 9, 2002 (JP) .................................. 2002-002713

(51) Int. Cl.⁷ .............................. G11B 7/24; B32B 3/00
(52) U.S. Cl. .................... 720/719; 369/275.5; 428/64.6
(58) Field of Search ................................ 369/283, 286, 369/284, 275.5; 428/64.4, 64.1, 64.6, 694 TP, 694 R; 720/719

(56) References Cited

U.S. PATENT DOCUMENTS

| | | | | |
|---|---|---|---|---|
| 4,782,477 A | * | 11/1988 | Ichihara et al. | 369/275.5 |
| 5,415,914 A | * | 5/1995 | Arioka et al. | 428/64.6 |
| 5,490,131 A | * | 2/1996 | Ohta et al. | 369/275.5 |
| 5,578,355 A | * | 11/1996 | Hirata et al. | 428/64.3 |
| 5,789,054 A | * | 8/1998 | Kahn et al. | 428/64.1 |
| 6,284,185 B1 | | 9/2001 | Tokuda et al. | |
| 2001/0036526 A1 | * | 11/2001 | Fukuzawa | 428/64.4 |
| 2002/0048646 A1 | * | 4/2002 | Tomura et al. | 428/64.4 |
| 2003/0128651 A1 | * | 7/2003 | Yamasaki et al. | 369/283 |

FOREIGN PATENT DOCUMENTS

| | | | | | |
|---|---|---|---|---|---|
| JP | 06195750 A | * | 7/1994 | | G11B/7/24 |
| JP | 8-170055 A | | 7/1996 | | |
| JP | 2001040246 A | * | 2/2001 | | C09D/4/00 |

* cited by examiner

*Primary Examiner*—Brian E. Miller
(74) *Attorney, Agent, or Firm*—Frishauf, Holtz, Goodman & Chick, P.C.

(57) ABSTRACT

A protective film for optical disks comprising an acrylic adhesive layer disposed on one face of a light transmitting substrate film, wherein a change in transmittance (X) expressed by equation [1] is 10% or smaller and the amount of elution of halogen ions and the amount of alkaline ions from an acrylic adhesive constituting the acrylic adhesive layer are each 10 ppm or smaller; and an optical disk using the protective film.

$$X(\%)=[(T_a-T_b)/T_a]\times 100 \qquad [1]$$

($T_a$: an initial transmittance of light of 405 nm through the protective film, $T_b$: a transmittance of light of 405 nm through the protective film after the protective film is left standing at 80° C. in 85% RH for 1,000 hours). The protective film is used for protecting the information recording layer of the optical disk and the functions of recording and regeneration of the optical disk are not adversely effected.

8 Claims, No Drawings

PROTECTIVE FILM FOR OPTICAL DISKS AND OPTICAL DISK USING THE FILM

BACKGROUND OF THE INVENTION

1. Field of the Invention

The present invention relates to a protective film for optical disks and an optical disk using the protective film. More particularly, the present invention relates to a protective film for optical disks which is used for protecting an information recording layer of optical disks and exhibits no adverse effects on the functions of recording and regeneration of the optical disk and an optical disk comprising the protective film attached to the information recording layer via an adhesive layer.

2. Description of Related Art

Development of optical disks as the information recording media in recent years is remarkable. Already, disks used only for reading information such as CD and CD-ROM, opto-magnetic disks called MOD or MD, phase-transition disks called PD and writable optical disks called CD-R are widely used. The recording capacity of these disks is about 650 MB (megabytes). Disks having greater capacities such as a series of optical disks called DVD (digital video disk) are developed. Specific examples of DVD include DVD-ROM (DVD allowing reading only), DVD-R (DVD allowing additional writing), DVD-RAM and DVD-RW (DVD allowing rewriting). DVDs of these types have two substrates laminated together. DVDs having a capacity of 4.7 GB (gigabytes) on one face and 9.4 GB on two faces have been practically used. For recording and regeneration of the information, a red laser beam having a wavelength of about 630 to 650 nm is used. DVDs are expected to be optical disks of the next generation which replace video cassettes currently used.

However, the DVD of the present stage has a problem in that, for example, the recording is limited to about 30 minutes in the case of high density images. In order that DVD is used more widely, it is desired that high density images of at least two hours can be recorded on one face. An optical disk having a great capacity is required to satisfy the above desire and recording and regeneration using a laser beam having a shorter wavelength is required for this purpose. Therefore, the use of a blue laser beam having a wavelength of about 400 to 432 nm is currently studied.

The track pitch and the pit size can be decreased by using a blue laser beam having a shorter wavelength. However, a problem arises due to the decreased wavelength in that the focal depth decreases and the specifications and methods applied to the currently used DVD which is obtained by laminating substrates each having a thickness of 0.6 mm (the total thickness of the substrates is 1.2 mm) cannot be applied.

Therefore, for example, it is examined that a protective film having a thickness of 0.1 mm and made of the same material as that of the substrate is laminated on the information recording layer disposed on a substrate having a thickness of 1.1 mm. In this case, it can be considered that an adhesive of the ultraviolet light curing type or a pressure-sensitive adhesive is used for lamination of the protective film. It is important that the adhesive or the pressure-sensitive adhesive does not adversely affect the functions of recording and regeneration of the optical disk.

SUMMARY OF THE INVENTION

The present invention has an object of providing a protective film for optical disks which is used for protecting the information recording layer of optical disks and does not adversely affect the functions of recording and regeneration of the optical disks, and an optical disk which has protective film laminated on the information recording layer and exhibits excellent reliability.

As the result of extensive studies by the present inventors to develop the protective film for optical disks having the above advantageous properties and the optical disk having the protective film and exhibiting excellent reliability, it was found that the above object could be achieved by using an adhesive film having an acrylic adhesive layer having specific properties on one face of a light transmitting substrate film and by an optical disk having a light transmitting film laminated on the information recording layer via an acrylic adhesive layer having specific properties. The present invention has been completed based on the above knowledge.

The present invention provides:

(1) A protective film for optical disks which comprises a light transmitting substrate film and a layer of acrylic adhesive disposed on one face of the substrate film, the acrylic adhesive comprising as a main component a polymer which comprises a (meth)acrylic ester-based monomer component, wherein, when $T_a$ represents an initial transmittance of light having a wavelength of 405 nm through the protective film and $T_b$ represents a transmittance of light having said wave length through the protective film after the protective film is left standing in an environment of a temperature of 80° C. and a relative humidity of 85% for 1,000 hours, a change in transmittance (X) expressed by equation [1]:

$$X(\%)=[(T_a-T_b)/T_a]\times 100 \qquad [1]$$

is 10% or smaller and an amount of elution of halogen ions and an amount of elution of alkaline ions from an acrylic adhesive constituting the acrylic adhesive layer are each 10 ppm or smaller.

(2) A protective film according to claim 1, wherein the polymer has a content of monomer component having nitrogen of 5.0% by mole or smaller based on the amount of the polymer.

(3) A protective film according to any one of (1) and (2), wherein the acrylic adhesive comprises 0.005 to 10% by weight of an antioxidant.

(4) A protective film according to any one of (1) to (3), wherein the acrylic adhesive has a total content of a residual solvent and a residual monomer of 100 ppm or smaller.

(5) A protective film according to any one of (1) to (4), wherein the polymer has a content of monomer component having carboxyl group of 10.0% by mole or smaller based on the amount of the polymer.

(6) An optical disk which comprises a substrate for an optical disk, an information recording layer disposed at least on one face of the substrate and a light transmitting film laminated on the information recording layer via an acrylic adhesive layer, wherein
when $T_a$ represents an initial transmittance of light having a wavelength of 405 nm through a laminate portion comprising the acrylic adhesive layer and the light transmitting film and $T_b$ represents a transmittance of light having said wave length through said laminate portion after the laminate portion is left standing in an environment of a temperature of 80° C. and a relative humidity of 85% for 1,000 hours, a change in transmittance (X) expressed by equation [1]:

$$X(\%)=[(T_a-T_b)/T_a]\times 100 \qquad [1]$$

is 10% or smaller; and when $R_a$ represents an initial reflectivity of light having a wavelength of 405 nm by the optical disk and $R_b$ represents a reflectivity of light having said wavelength by the optical disk after the optical disk is left standing under a same condition as that described above, a change in reflectivity (Y) by the optical disk expressed by equation [2]:

$$Y(\%)=[(R_a-R_b)/R_a]\times 100 \qquad [2]$$

is 20% or smaller.

(7) An optical disk which comprises a substrate for optical disks, an information recording layer disposed at least on one face of the substrate and a light transmitting film laminated on the information recording layer via an acrylic adhesive layer, the optical disk exhibiting a bit error rate of 0.1% or smaller after the optical disk is left standing in an environment of a temperature of 80° C. and a relative humidity of 85% for 1,000 hours; and (8) An optical disk which comprises a substrate for optical disks, an information recording layer disposed at least on one face of the substrate and a protective film for optical disks described in any one of claims (1) to (5) attached to the information recording layer via the acrylic adhesive layer.

DESCRIPTION OF THE PREFERRED EMBODIMENTS

The protective film of the present invention is used for protecting the information recording layer of optical disks and constituted with a light transmitting substrate film and an acrylic adhesive layer disposed on one face thereof.

In the present invention, a light transmitting film is used as the substrate film. The light transmitting film means a film transparent with respect to the laser beam used for the optical disk to which the protective film of the present invention is applied. Therefore, in general, a film transmitting visible light having a wavelength in the range of 380 to 780 nm is used. As the light transmitting substrate film, for example, films made of transparent resins such as acrylic resins, polyolefinic resins and polycarbonate resins can be used. It is preferable that the film has a thermal expansion coefficient close to that of the substrate of the optical disk to which the protective film is applied. In general, a film having the same quality as that of the substrate is used. Therefore, in general, a polycarbonate film is used as the light transmitting substrate film since, in general, the polycarbonate resin is used for the resin substrate of optical disks.

It is preferable that the light transmitting substrate film has a surface as flat as possible and birefringence is suppressed. When the birefringence takes place with the substrate film, the degree of focussing of the laser beam decreases and such a condition is not preferable. It is preferable that the fluctuation in the thickness is as small as possible. When the fluctuation in the thickness is present, the degree of focussing of the laser beam decreases. Where desired, a layer for preventing formation of scratches can be formed on the face opposite to the face having the adhesive layer so that formation of scratches is suppressed even when an optical head of a driver contacts the surface of the film.

In the present invention, the thickness of the light transmitting substrate film can be suitably selected in accordance with the wavelength of the laser beam used for the optical disk to which the protective film of the present invention is applied. In general, the thickness is selected in the range of 50 to 100 µm, preferably in the range of 60 to 90 µm and more preferably in the range of 65 to 85 µm.

In the protective film for optical disks of the present invention, it is necessary that the change in the transmittance (X) expressed by equation [1]:

$$X(\%)=[(T_a-T_b)/T_a]\times 100 \qquad [1]$$

be 10% or smaller in the accelerated durability test. In equation [1], $T_a$ represents the initial transmittance of light having a wavelength of 405 nm through the protective film and Tb represents the transmittance of light having said wave length through the protective film after the protective film is left standing in the environment of a temperature of 80° C. and a relative humidity of 85% for 1,000 hours. When the change in transmittance (X) exceeds 10%, the change in reflectivity by the optical disk to which the protective film is attached increases with passage of time and stability decreases with passage of time. It is preferable that the change in transmittance is 7% or smaller and more preferably 5% or smaller. The change in transmittance described above is the value measured in accordance with the following method.

Method for Measuring the Change in Transmittance of a Protective Film for Optical Disks A protective film for optical disks is attached to a soda lime glass plate having a thickness of 1.1 mm and the initial transmittance $T_a$ of light having a wavelength of 405 nm is measured using a spectrophotometer for ultraviolet and visible light [manufactured by SHIMADZU SEISAKUSHO Co., Ltd.; the trade name: UV-3100PC]. Then, the transmittance $T_b$ is measured after the protective film for optical disks attached to the soda lime glass plate is left standing in the environment of a temperature of 80° C. and a relative humidity of 85%. The change in transmittance (X) is calculated in accordance with equation [1].

It is necessary that the amount of elution of halogen ions such as $F^-$, $Cl^-$ and $Br^-$ and the amount of elution of alkaline ions such as $Na^+$ and $NH_4^+$ from an acrylic adhesive constituting the acrylic adhesive layer be each 10 ppm or smaller. When the amount of elution of halogen ions exceeds 10 ppm or the amount of elution of alkaline ions exceeds 10 ppm, the substrate, the reflection film and the information recording layer of the optical disk tend to be affected with the adhesive and this causes a decrease in reliability of the optical disk. It is preferable that the amount of elution of halogen ions and the amount of elution of alkaline ions from an acrylic adhesive constituting the acrylic adhesive layer are each 5 ppm or smaller and more preferably 3 ppm or smaller. The amounts of halogen ions and the amounts of alkaline ions are the values measured in accordance with the following method.

Method for Measuring the Amounts of Elution of Halogen Ions and Alkaline Ions

Into 20 ml of pure water, 1 g of an acrylic adhesive constituting the adhesive layer is placed and treated by heating at 121° C. for 24 hours under a pressure. The amounts of eluted ions in the pure water are measured using an ion chromatograph [manufactured by YOKOGAWA DENKI Co., Ltd.; the trade name: ION CHROMATOANALYZER IC-5000]. As the halogen ions, $F^-$, $Cl^-$, $Br^-$ and $I^-$ are measured and, as the alkaline ions, $Li^+$, $Na^+$, $K^+$ and $NH_4^+$ are measured. The total of the amounts of the halogen ions is used as the amount of eluted halogen ions and the total of the amounts of the alkaline ions is used as the amount of eluted alkaline ions.

It is preferable that the polymer in the acrylic adhesive has a content of a monomer component having nitrogen of 5.0% by mole or smaller based on the amount of the polymer. When the content of the monomer component having nitrogen exceeds 5.0% by mole, there is the possibility that the substrate film of the protective film and the substrate of the optical disk are corroded. It is more preferable that the content of the monomer component having nitrogen is 3.0% by mole of smaller and most preferably 2.0% by mole or smaller based on the amount of the polymer. Examples of the monomer component having nitrogen include acrylamides such as acrylamide, methacrylamide, N-methylacrylamide, N-methylmethacrylamide, N,N-dimethylacrylamide, N,N-dimethylmethacrylamide, N-methylolacrylamide and N-methylol-methacrylamide; nitrile-based monomers such as acrylonitrile and methacrylonitrile; dialkylaminoalkyl (meth)acrylates such as dimethyl-amionoethyl (meth)acrylate and diethylaminoethyl (me)acrylate.

From the standpoint of suppressing corrosion of the reflection film and the information recording layer of the optical disk, it is preferable that the acrylic adhesive contains an antioxidant in a content in the range of 0.005 to 10% by weight. When the content of the antioxidant is smaller than 0.005% by weight, the effect of suppressing corrosion of the reflection film and the information recording layer is not sufficiently exhibited. When the content of the antioxidant exceeds 10% by weight, the effect of the antioxidant is not exhibited to the degree expected from the content and economic disadvantage arises. It is more preferable that the content of the antioxidant is in the range of 0.01 to 5% by weight and most preferably in the range of 0.1 to 3% by weight.

The antioxidant is not particularly limited and a suitable antioxidant can be selected from conventional antioxidants such as hindered phenolic antioxidants, amine-based antioxidants, sulfur-based antioxidants, phosphorus-based antioxidants and quinone-based antioxidants. The hindered phenol-based antioxidants are preferable. Examples of the antioxidant include phenolic antioxidants having a single ring such as 2,6-di-tert-butyl-p-cresol, butylhydroxyanisole and stearyl β-(3,5-di-tert-butyl-4-hydroxyphenyl) propionate; phenolic antioxidants having two rings such as 4,4'-butylidenebis(3-methyl-6-tert-butylphenol) and 3,6-dioxaoctamethylene bis [3-(3-tert-butyl-4-hydroxy-5-methyl-phenyl)propionate; phenolic antioxidants having three rings such as 1,1,3-tris(2-methyl-4-hydroxy-5-tert-butylphenyl)butane; and phenolic antioxidants having four rings such as tetrakis[methylene 3-(3',5'-di-tert-butyl-4'-hydroxyphenyl)propionate]methane. The antioxidants may be used singly or in combination of two or more.

From the standpoint of suppressing invasion into the substrate film of the protective film and the substrate of the optical disk and corrosion of the reflection film and the information recording layer of the optical disk, it is preferable that the acrylic adhesive has the total content of the residual solvent and the residual monomer of 100 ppm or smaller. When the total content of the residual solvent and the residual monomer exceeds 100 ppm, invasion into the substrate film of the protective film and the substrate film of the optical disk and corrosion of the substrate, the reflection film and the information recording layer of the optical disk may take place. It is more preferable that the total content of the residual solvent and the residual monomer is 50 ppm or smaller and most preferably 20 ppm or smaller. The total content of the residual solvent and the residual monomer is the value measured in accordance with the following method.

Method for Measuring the Total Content of the Residual Solvent and the Residual Monomer Into a vial having a volume of 22 ml, 0.02 g of an acrylic adhesive constituting the adhesive layer is placed and kept at 120° C. for 30 minutes. Then, the gas phase component in the vial is introduced into a gas chromatograph [manufacture by HEWLETT PACKARD Company; the 6890 type] using a head space sampler [manufactured by PERKIN ELMER Company; the trade name: Turbo Matrix] and the measurement is conducted. As the separation column, a column manufactured by HEWLETT PACKARD Company, HP-5, is used.

From the standpoint of suppressing corrosion of the reflection film and the information recording layer of the optical disk, it is preferable that the polymer in the acrylic adhesive has a content of a monomer component having carboxyl group of 10.0% by mole or smaller based on the amount of the polymer. When the content of the monomer component having carboxyl group exceeds 10.0% by mole, corrosion of the reflection film and the information recording layer of the optical disk may take place. From the standpoint of suppressing corrosion and of insuring the desired adhesive strength, it is more preferable that the content of the monomer component having carboxyl group is in the range of 0.1 to 8.0% by mole and most preferably in the range of 2.0 to 5.0% by mole based on the amount of the polymer. Examples of the monomer having carboxyl group include ethylenically unsaturated carboxylic acids such as acrylic acid, methacrylic acid, crotonic acid, maleic acid, itaconic acid and citraconic acid.

The acrylic adhesive used in the present invention is a polymer which comprises a (meth)acrylic ester-based monomer component. For example, crosslinking agents and the antioxidants described above may be added to the polymer and the obtained composition can be used as the acrylic adhesive.

Preferable examples of the (meth)acrylic ester-based polymer described above include copolymers of a (meth) acrylic ester having an alkyl group having 1 to 20 carbon atoms in the ester portion, a monomer having a functional group having active hydrogen and other monomers used where desired.

Examples of the (meth)acrylic ester having an alkyl group having 1 to 20 carbon atoms in the ester portion include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth) acrylate, dodecyl (meth)acrylate, myristyl (meth)acrylate, palmityl (meth)acrylate and stearyl (meth)acrylate. The (meth)acrylic ester may be used singly or in combination of two or more.

Examples of the monomer having a functional group having active hydrogen include hydroxyalkyl esters of (meth)acrylic acid such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate and 4-hydroxybutyl (meth)acrylate; acrylamides such as acrylamide, methacrylamide, N-methylacrylamide, N-methylmethacrylamide, N-methylol acrylamide and N-methylol methacrylamide; monoalkylaminoalkyl esters of (meth)acrylic acid such as monomethylaminoethyl (meth)acrylate, monoethylaminoethyl (meth)-acrylate, monomethylaminopropyl (meth) acrylate and monoethylamino-propyl (meth)acrylate; and ethylenically unsaturated carboxylic acids such as acrylic acid, methacrylic acid, crotonic acid, maleic acid, itaconic acid and citraconic acid. The above monomer may be used singly or in combination of two or more.

Examples of the other monomer used where desired include vinyl esters such as vinyl acetate and vinyl propionate; olefins such as ethylene, propylene and isobutylene; halogenated olefins such as vinyl chloride and vinylidene chloride; styrene-based monomers such as styrene and α-methylstyrene; diene-based monomers such as butadiene, isoprene and chloroprene; nitrile-based monomers such as acrylonitrile and methacrylonitrile; and N,N-dialkylsubstituted acrylamides such as N,N-dimethylacrylamide and N,N-dimethylmethacrylamide. The other monomer may be used singly or in combination of two or more.

It is preferable that the amounts of the monomer having nitrogen and the monomer having carboxyl group, among the above monomers, are selected in a manner such that the content of the monomer in the polymer is in the range of 0.1 to 5.0% by mole and in the range of 0.1 to 10.0% by mole, respectively.

In the acrylic adhesive, the form of the (meth)acrylic ester-based polymer used as the resin component is not particularly limited and any of a random copolymer, a block copolymer and a graft copolymer may be used. It is preferable that the (meth)acrylic ester-based copolymer has a weight-average molecular weight in the range of 500,000 to 2,000,000 from the standpoint of surely achieving reliability of the optical disk without adverse effects on the optical disk.

The weight-average molecular weight described above is obtained by the measurement in accordance with the gel permeation chromatography (GPC) and expressed as the value of the corresponding polystyrene.

In the present invention, the (meth)acrylic ester-based copolymer may be used singly or in combination of two or more.

The crosslinking agent in the acrylic adhesive is not particularly limited and can be suitably selected from crosslinking agents conventionally used as the crosslinking agent in acrylic adhesives such as polyisocyanate compounds, epoxy resins, melamine resins, urea resins, dialdehydes, methylol polymers, metal chelate compounds, metal alkoxides and metal salts in accordance with the types of the reflection film and the information recording layer of the optical disk to which the protective film is applied.

In the protective film of the present invention, the adhesive layer may be formed by directly coating one face of the light transmitting substrate film with the acrylic adhesive described above or by coating a release sheet with the acrylic adhesive to form an adhesive layer, followed by attaching the resultant sheet on one face of the substrate film and transferring the adhesive layer to the substrate film. In the latter case, where desired, the release sheet may be temporarily left being attached to the substrate and removed when the protective film is used. The thickness of the adhesive layer formed on one face of the substrate is, in general, in the range of about 5 to 100 μm and preferably in the range of about 10 to 60 μm.

Examples of the release sheet include sheets obtained by coating a paper substrate such as glassine paper, coated paper and cast coating paper, a laminate paper obtained by laminating a thermoplastic resin such as polyethylene on the paper substrate, a film of a polyesters such as polyethylene terephthalate, polybutylene terephthalate and polyethylene naphthalate and a plastic films which is, for example, a film of a polyolefin such as polypropylene and polyethylene with a releasing agent such as a silicone resin. The thickness of the release sheet is not particularly limited and, in general, in the range of about 20 to 150 μm.

When the acrylic adhesive is applied to one face of the light transmitting substrate film or the release sheet, in general, a solvent such as ethyl acetate and toluene is added to the adhesive and the resultant solution is applied. The formed coating layer is dried and the adhesive layer is formed. It is preferable that the adhesive layer is dried at a temperature of 70° C. or higher and more preferably at a temperature in the range of 80 to 150° C. for about 10 seconds to 10 minutes.

The protective film for optical disks of the present invention obtained as described above is attached to the information recording layer of the optical disk via the acrylic adhesive layer to protect the information recording layer. Since the protective film for optical disks of the present invention uses the acrylic adhesive having the above properties as the acrylic adhesive layer, an optical disk exhibiting excellent reliability without adverse effects on the functions of recording and regeneration of the information of the optical disk can be provided.

The optical disk of the present invention has the structure in which a light transmitting film is laminated on the information recording layer disposed at least on one face of the substrate for optical disks via the acrylic adhesive. Three embodiments of the optical disk, i.e., optical disk I, optical disk II and optical disk III are shown in the following.

In optical disk I of the present invention, the change in transmittance (X) expressed by equation [1]:

$$X(\%)=[(T_a-T_b)/T_a]\times 100 \quad [1]$$

is 10% or smaller and the change in reflectivity (Y) by the optical disk expressed by equation [2]:

$$Y(\%)=[(R_a-R_b)/R_a]\times 100 \quad [2]$$

is 20% or smaller.

In equation [1] described above, $T_a$ represents the initial transmittance of light having a wavelength of 405 nm through a laminate portion comprising the acrylic adhesive layer and the light transmitting film and $T_b$ represents a transmittance of light having said wave length through said laminate portion after being left standing in an environment of a temperature of 80° C. and a relative humidity of 85% for 1,000 hours.

In equation [2] described above, $R_a$ represents an initial reflectivity of light having a wavelength of 405 nm by the optical disk and $R_b$ represents a reflectivity of light having said wavelength by the optical disk after being left standing under the same condition as that described above.

The effect of the change in transmittance (X) of the laminate portion comprising the acrylic adhesive layer and the light transmitting film is the same as that described above for the protective film for optical disks of the present invention. When the change in reflectivity (Y) expressed by the above equation [2] exceeds 20%, the bit error rate increases and the reliability of the optical disk is adversely affected. The increase in the change in reflectivity is caused by degradation of the light transmitting film disposed on the information recording layer or the substrate of the optical disk or by corrosion of the reflection film or the information recording layer. It is preferable that the change in reflectivity is 15% or smaller and more preferably 10% or smaller. The change in reflectivity by the optical disk is a value measured in accordance with the following method.

Method for Measuring the Change in Reflectivity by an Optical Disk

An optical disk is irradiated with light having a wavelength of 405 nm at the side having the light transmitting film and the initial reflectivity $R_a$ is measured using a spectrophotometer for ultraviolet and visible light

[manufactured by SHIMADZU SEISAKUSHO Co., Ltd.; the trade name: UV-3100PC].

Then, the reflectivity $R_b$ is measured in accordance with the same method after the optical disk is left standing in the environment of a temperature of 80° C. and a relative humidity of 85% for 1,000 hours. The change in reflectivity (Y) is calculated in accordance with equation [2].

Optical disk II of the present invention exhibits a bit error rate of 0.1% or smaller after the optical disk is left standing in an environment of a temperature of 80° C. and a relative humidity of 85% for 1,000 hours. Examples of various functional layers constituting the optical disk, which include the information recording layer, include a reflection film and an information recording layer having a structure comprising a layer of a dielectric substance, a layer of a recording material and another layer of a dielectric substance. It is necessary that an acrylic adhesive do not affect the various functional layers constituting the optical disk including the information recording layer after being left standing in an environment of a temperature of 80° C. and a relative humidity of 85% for 1,000 hours. When the acrylic adhesive has properties adversely affecting the functional layers such as the corroding property, it is difficult that the bit error rate is kept at 0.1% or smaller.

It is preferable that the bit error rate is 0.05% or smaller and more preferably 0.01% or smaller. The bit error rate is the value measured in accordance with the following method.

Method for Measuring the Bit Error Rate

The same information is recorded in an optical disk and RAM. After the optical disk is left standing in an environment of a temperature of 80° C. and a relative humidity of 85% for 1,000 hours, data in the optical disk obtained by regeneration of signals using a laser beam having a wavelength of 405 nm are compared with the data recorded in RAM and the bit error rate is calculated from the result of the comparison.

Optical disk III comprises a substrate for optical disks, an information recording layer disposed at least on one face of the substrate and a protective film for optical disks described above attached to the information recording layer via the acrylic adhesive layer.

Optical disk III in which the protective film for optical disks of the present invention is attached can easily achieve a change in reflectivity (Y) as expressed by equation [2] of 20% or smaller and a bit error rate of 0.1% or smaller.

The substrate in the optical disk of the present invention is not particularly limited as long as the substrate is used conventionally for optical disk. In general, a substrate of a polycarbonate resin is used. The thickness of the substrate is suitably selected in accordance with the standard for the total thickness of the optical disk and the thickness of the protective film disposed on the information recording layer. The thickness of the substrate is, in general, in the range of 1.05 to 1.15 mm.

The construction of the functional layers disposed on the substrate is not particularly limited as long as the construction is used conventionally for optical disks. When the disk is used only for reading information, for example, a reflecting metal film alone is formed by the sputtering process or the like as the information recording layer. When the disk allows writing and reading, for example, a recording material such as a recording material of the phase change type and a recording material of the optomagnetic type is used and a construction having a layer of a dielectric substance, a layer of the recording material and another layer of a dielectric substance formed on a reflection film may be formed.

Examples of the reflection film include films of silver alloys, films of aluminum and films of an aluminum alloys. Examples of the recording material in the information recording layer include recording materials of the phase change type such as TeOx, Te—Ge, Sn—Te—Ge, Bi—Te—Ge, Sb—Te—Ge and Pb—Sn—Te and recording materials of the optomagnetic type such as Tb—Fe, Tb—Fe—Co, Dy—Fe—Co and Tb—Dy—Fe—Co. Examples of the dielectric substance in the information recording layer include SiN, SiO, $SiO_2$, ZnS—$SiO_2$ and $Ta_2O_5$.

A blue laser beam can be used for the optical disk of the present invention. The optical disk of the present invention can be advantageously used as the optical disk of the DVD series having a great capacity such as DVD-ROM, DVD-R, DVD-RAM and DVD-RW.

To summarize the advantages of the present invention, the protective film is used for protecting the information recording layer of the optical disk and does not adversely affect the functions of recording and regeneration of information of the optical disk.

The optical disk of the present invention having the protective film disposed on the information recording layer exhibits excellent reliability, allows the use of a blue laser beam and is advantageously used for optical disks of the DVD series having a great capacity.

EXAMPLES

The present invention will be described more specifically with reference to examples in the following. However, the present invention is not limited to the examples.

The properties of an acrylic adhesive and an optical disk were obtained in accordance with the methods described above.

Reference Example

Preparation of a substrate for an optical disk having an information recording layer.

A substrate of a polycarbonate resin which had a thickness of 1.1 mm, an outer diameter of 20 mm and an inner diameter of 15 mm and had signals of protrusions and depressions corresponding to bits of 20 GB (the track pitch: 0.36 μm; the shortest length of the pitch: 0.19 μm) on one face thereof was formed in accordance with the injection molding. A reflection film made of a silver alloy having a thickness of 20 nm was formed on the side having the signals of protrusions and depressions in accordance with the sputtering process and an information recording layer was formed.

On the information recording layer, information having a fixed length of 4,386 bytes encoded in accordance with the modulation method of EFM+ was recorded repeatedly.

Example 1

Into a flask, 98 g of n-butyl acrylate and 2 g of 2-hydroxyethyl acrylate as the monomers, 400 g of ethyl acetate as the solvent and 0.25 g of azobisisobutyronitrile as the polymerization initiator were placed. The polymerization was conducted under an atmosphere of nitrogen at 60° C. for 3 hours and then at 70° C. for 12 hours and a copolymer of acrylic esters having the components of n-butyl acrylate and 2-hydroxyethyl acrylate was obtained. To 100 parts by weight of the solid component of the copolymer of acrylic esters, 0.6 parts by weight of a polyisocyanate compound [manufactured by TAKEDA YAKUHIN KOGYO Co., Ltd.; the trade name: TAKENATE D-140N] as the crosslinking agent was added. A sheet made of polyethylene terephthalate having a thickness of 38 μm which was subjected to a releasing treatment on one face thereof with a silicone resin was used as the release sheet. The mixture obtained above was applied to the face having the releasing treatment of the release sheet in an amount such that the formed adhesive layer had a thickness of 30 μm after being dried. The adhesive layer was dried at 100° C. for 2 minutes in an oven and an acrylic adhesive layer composed of the acrylic adhesive was formed.

Then, the release sheet having the acrylic adhesive layer obtained above was laminated to a film of a polycarbonate resin having a thickness of 70 μm [manufactured by TEIJIN Co., Ltd.; the trade name: PURE ACE C110-70] as the light transmitting substrate film using a laminator. The acrylic adhesive layer was transferred by removing the release sheet and a protective film for optical disks was prepared.

The results of evaluation of the acrylic adhesive and the protective film for optical disks are shown in Table 1.

Example 2

A protective film for optical disks was prepared in accordance with the same procedures as those conducted in Example 1 except that 79 g of n-butyl acrylate, 3 g of 2-hydroxyethyl acrylate and 1 g of acrylamide as the monomer having nitrogen were used and a copolymer of acrylic esters containing 1.68% by mole of the monomer component having nitrogen was prepared.

The results of evaluation of the acrylic adhesive and the protective film for optical disks are shown in Table 1.

Example 3

A protective film for optical disks was prepared in accordance with the same procedures as those conducted in Example 1 except that 75 g of n-butyl acrylate, 22 g of ethyl acrylate, 0.5 g of 2-hydroxyethyl acrylate and 3 g of acrylic acid as the monomer having carboxyl group were used and a metal chelate compound [manufactured by KAWASAKI FINE CHEMICAL Co., Ltd.; the trade name: ALUMICHELATE D] was used as the crosslinking agent. The content of the acrylic acid component in the copolymer was 4.89% by mole.

The results of evaluation of the acrylic adhesive and the protective film for optical disks are shown in Table 1.

Example 4

A protective film for optical disks was prepared in accordance with the same procedures as those conducted in Example 3 except that a hindered phenolic antioxidant which was 2,6-di-tert-butyl-p-cresol was added to the acrylic adhesive as the antioxidant in an amount of 1% by weight.

The results of evaluation of the acrylic adhesive and the protective film for optical disks are shown in Table 1.

TABLE 1

|  | Change in transmittance X (%) | Amount of elution of halogen ions (ppm) | Amount of elution of alkaline ions (ppm) | Total content of residual solvent and monomer (ppm) |
| --- | --- | --- | --- | --- |
| Example 1 | 4.6 | 0.21 | 0.22 | 22 |
| Example 2 | 3.8 | 0.51 | 0.93 | 27 |

TABLE 1-continued

|  | Change in transmittance X (%) | Amount of elution of halogen ions (ppm) | Amount of elution of alkaline ions (ppm) | Total content of residual solvent and monomer (ppm) |
| --- | --- | --- | --- | --- |
| Example 3 | 4.2 | 1.20 | 0.51 | 18 |
| Example 4 | 4.3 | 1.20 | 0.51 | 20 |

Examples 5 to 8

The protective films for optical disks obtained in Examples 1 to 4 were laminated to substrates for an optical disk having an information recording layer in a manner such that the acrylic adhesive layer of each protective film was attached to the information recording layer of each substrate and optical disks were prepared.

The results of evaluation of optical disks are shown in Table 2.

TABLE 2

|  | Type of protective film | Change in reflectivity Y (%) | Bit error rate (%) |
| --- | --- | --- | --- |
| Example 5 | Example 1 | 10.0 | 0.0032 |
| Example 6 | Example 2 | 9.3 | 0.0087 |
| Example 7 | Example 3 | 9.8 | 0.0046 |
| Example 8 | Example 4 | 8.8 | 0.0033 |

Comparative Example 1

A protective film for optical disks was prepared in accordance with the same procedures as those conducted in Example 2 except that 3 g of acrylamide was used, 2 g of dimethylaminoethyl acrylate was added and an acrylic copolymer having the content of the monomer component having nitrogen of 6.4% by mole was prepared.

The results of evaluation of the acrylic adhesive and the protective film for optical disks are shown in Table 3.

Comparative Example 2

A protective film for optical disks was prepared in accordance with the same procedures as those conducted in Example 1 except that the adhesive layer was dried at 60° C. for 1 minute.

The results of evaluation of the acrylic adhesive and the protective film for optical disks are shown in Table 3.

Comparative Example 3

A protective film for optical disks was prepared in accordance with the same procedures as those conducted in Example 1 except that 100 g of methylene chloride as the diluent was added to the mixture of the copolymer of the acrylic esters and ethyl acetate.

The results of evaluation of the acrylic adhesive and the protective film for optical disks are shown in Table 3.

TABLE 3

|  | Change in transmittance X (%) | Amount of elution of halogen ions (ppm) | Amount of elution of alkaline ions (ppm) | Total content of residual solvent and monomer (ppm) |
|---|---|---|---|---|
| Comparative Example 1 | 30.6 | 0.32 | 8.21 | 19 |
| Comparative Example 2 | 37.4 | 1.28 | 0.58 | 180 |
| Comparative Example 3 | 4.8 | 10.61 | 0.44 | 23 |

Comparative Examples 4 to 6

The protective films for optical disks obtained in Comparative Examples 1 to 3 were laminated to substrates for an optical disk having an information recording layer in a manner such that the acrylic adhesive layer of each protective film was attached to the information recording layer of each substrate and optical disks were prepared.

The results of evaluation of optical disks are shown in Table 4.

TABLE 4

|  | Type of protective film | Change in reflectivity Y (%) | Bit error rate (%) |
|---|---|---|---|
| Comparative Example 4 | Comparative Example 1 | 70.3 | not measurable* |
| Comparative Example 5 | Comparative Example 2 | 79.6 | not measurable* |
| Comparative Example 6 | Comparative Example 3 | 52.1 | 0.52 |

*Signals could not be regenerated and the measurement was not possible.

Comparative Example 7

A protective film for optical disks was prepared in accordance with the same procedures as those conducted in Example 3 except that 8 g of acrylic acid was used and an acrylic copolymer having the content of the monomer component having carboxyl group of 12.06% by mole was prepared. An optical disk was prepared in accordance with the procedures described above.

The obtained optical disk had a change in the reflectivity of 72.1% and a bit error rate of 0.37%. It is considered that this result was obtained since a copolymer having a great content of carboxyl group was used as the adhesive and the reflection film of the optical disk was corroded.

What is claimed is:

1. A protective film for optical disks which comprises a light transmitting substrate film and a layer of acrylic adhesive disposed on one face of the substrate film, the acrylic adhesive comprising as a main component a polymer which comprises a (meth)acrylic ester-based monomer component, wherein, when $T_a$ represents an initial transmittance of light having a wavelength of 405 nm through the protective film and $T_b$ represents a transmittance of light having said wave length through the protective film after the protective film is left standing in an environment of a temperature of 80° C. and a relative humidity of 85% for 1,000 hours, a change in transmittance (X) expressed by equation [1]:

$$X(\%)=[(T_a-T_b)/T_a]\times 100 \quad [1]$$

is 10% or smaller and an amount of elution of halogen ions and an amount of elution of alkaline ions from an acrylic adhesive constituting the acrylic adhesive layer are each 10 ppm or smaller.

2. A protective film according to claim 1, wherein the polymer has a content of monomer component having nitrogen of 5.0% by mole or smaller based on the amount of the polymer.

3. A protective film according to claim 1, wherein the acrylic adhesive comprises 0.005 to 10% by weight of an antioxidant.

4. A protective film according to claim 1, wherein the acrylic adhesive has a total content of a residual solvent and a residual monomer of 100 ppm or smaller.

5. A protective film according to claim 1, wherein the polymer has a content of monomer component having carboxyl group of 10.0% by mole or smaller based on the amount of the polymer.

6. An optical disk which comprises a substrate for an optical disk, an information recording layer disposed at least on one face of the substrate and a light transmitting film laminated on the information recording layer via an acrylic adhesive layer, wherein when $T_a$ represents an initial transmittance of light having a wavelength of 405 nm through a laminate portion comprising the acrylic adhesive layer and the light transmitting film and $T_b$ represents a transmittance of light having said wave length through said laminate portion after the laminate portion is left standing in an environment of a temperature of 80° C. and a relative humidity of 85% for 1,000 hours, a change in transmittance (X) expressed by equation [1]:

$$X(\%)=[(T_a-T_b)/T_a]\times 100 \quad [1]$$

is 10% or smaller; and when $R_a$ represents an initial reflectivity of light having a wavelength of 405 nm by the optical disk and $R_b$ represents a reflectivity of light having said wavelength by the optical disk after the optical disk is left standing under a same condition as that described above, a change in reflectivity (Y) by the optical disk expressed by equation [2]:

$$Y(\%)=[(R_a-R_b)/R_a]\times 100 \quad [2]$$

is 20% or smaller.

7. An optical disk which comprises a substrate for optical disks, an information recording layer disposed at least on one face of the substrate and a light transmitting film laminated on the information recording layer via an acrylic adhesive layer, the optical disk exhibiting a bit error rate of 0.1% or smaller after the optical disk is left standing in an environment of a temperature of 80° C. and a relative humidity of 85% for 1,000 hours.

8. An optical disk which comprises a substrate for optical disks, an information recording layer disposed at least on one face of the substrate and a protective film for optical disks described in any one of claim 1 attached to the information recording layer via the acrylic adhesive layer.

* * * * *